May 9, 1939.  J. W. OW  2,157,863
CONTROL APPARATUS
Filed Aug. 26, 1936  4 Sheets-Sheet 1
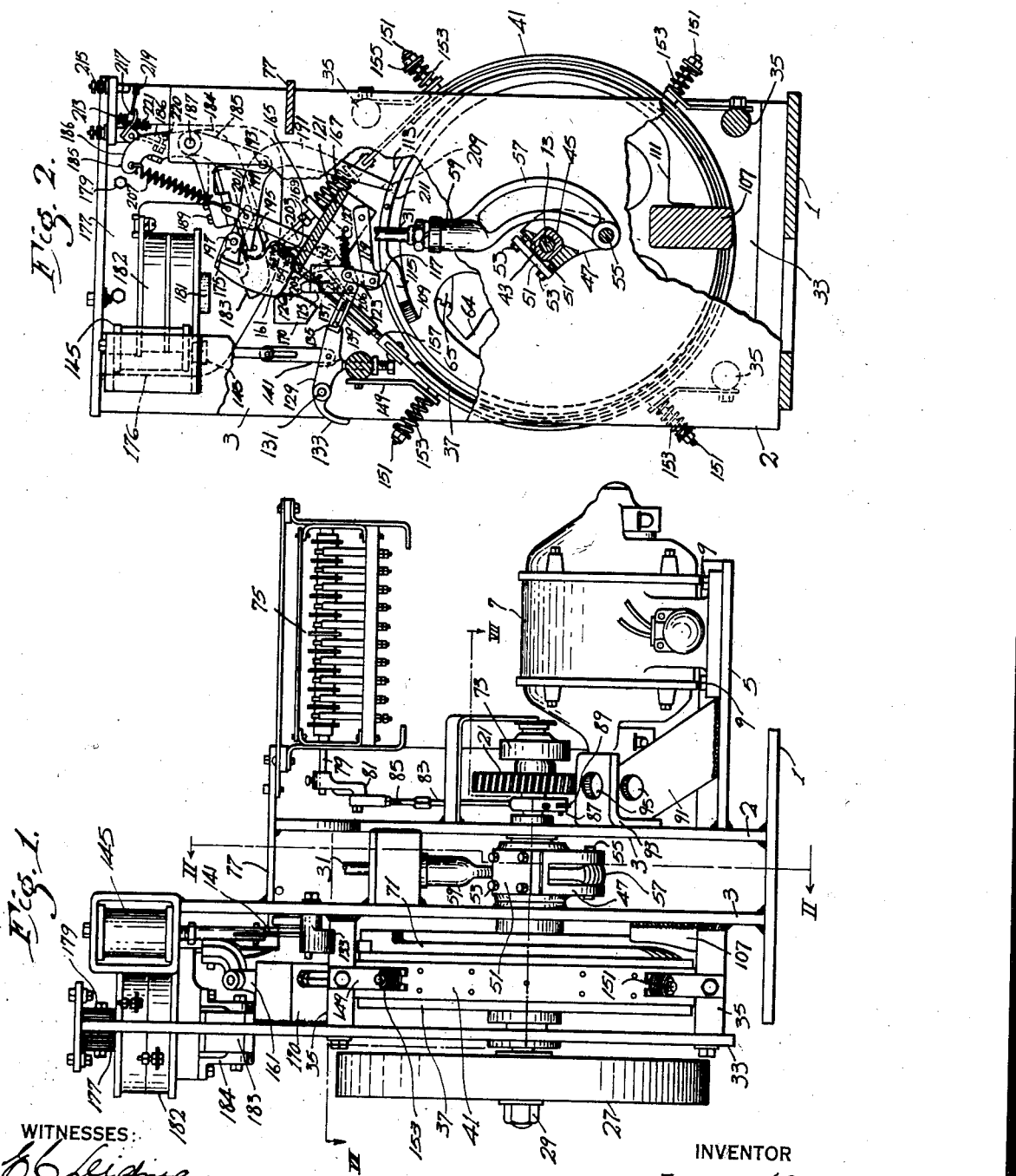
INVENTOR
Joseph W. Ow.
BY Ralph H. Swingle
ATTORNEY
WITNESSES:

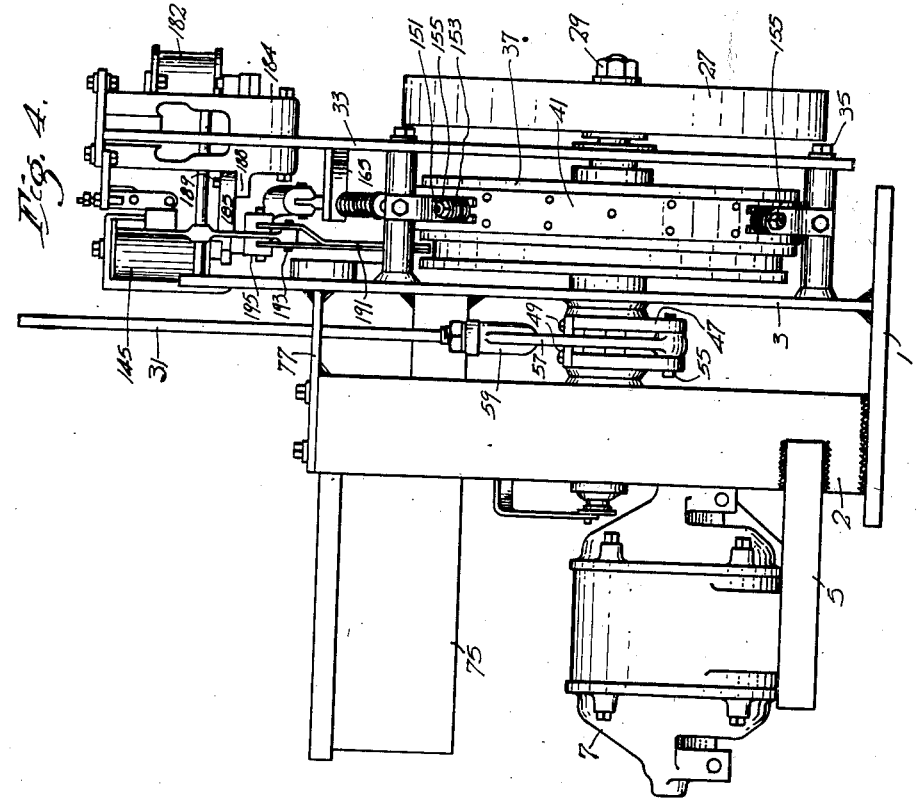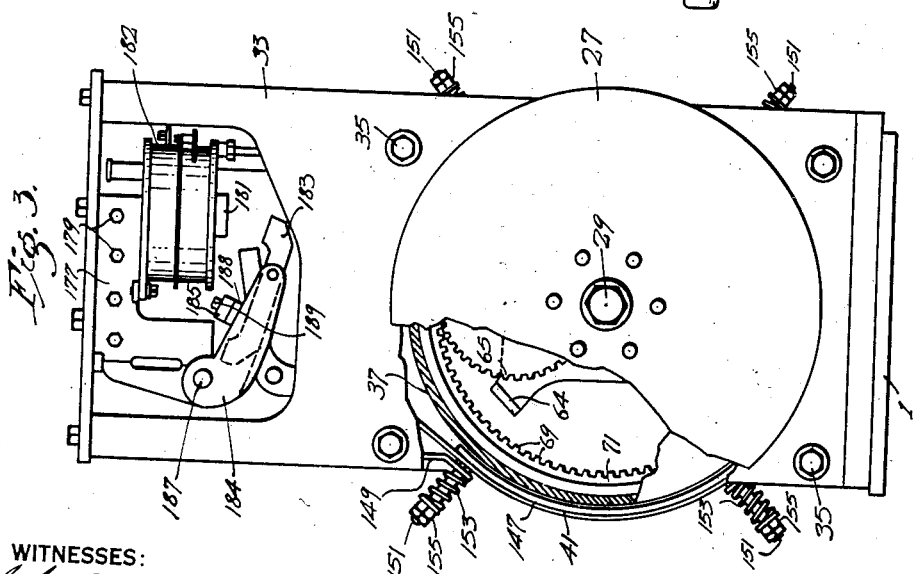

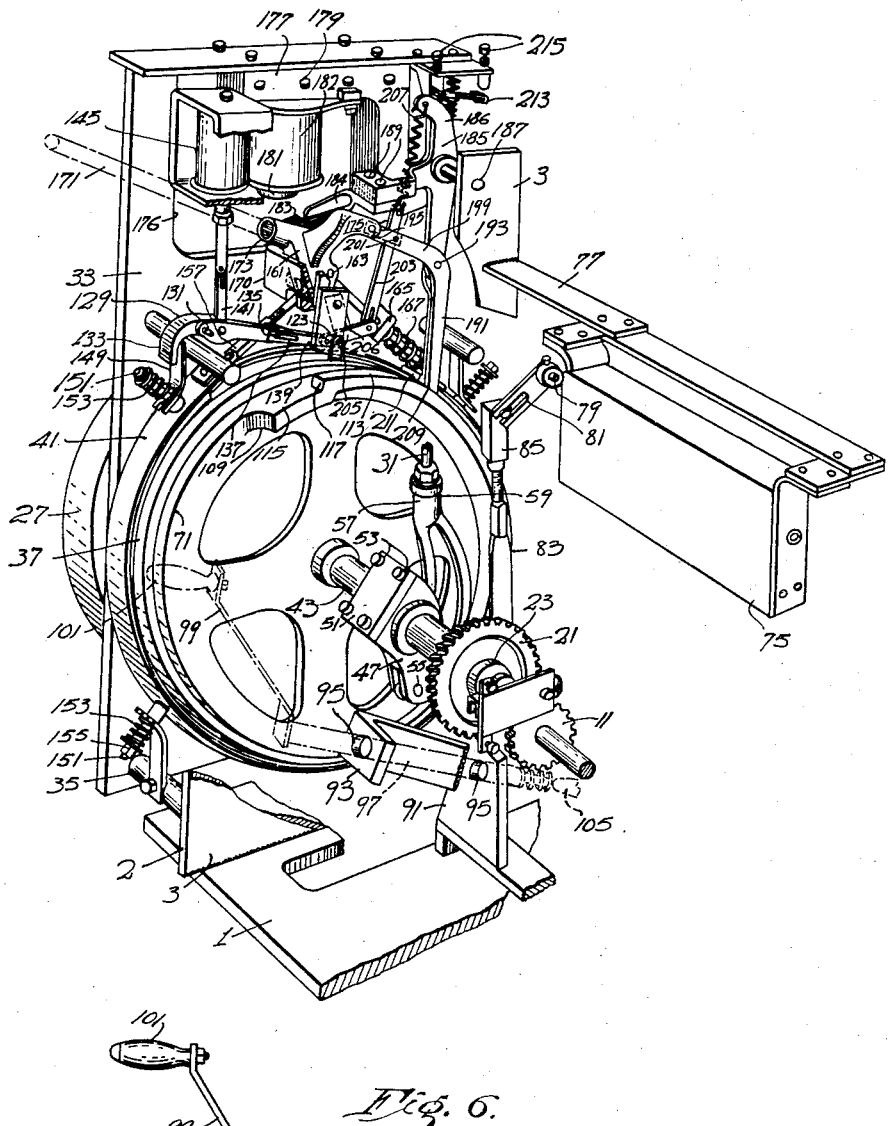

May 9, 1939. J. W. OW 2,157,863
CONTROL APPARATUS
Filed Aug. 26, 1936 4 Sheets-Sheet 4
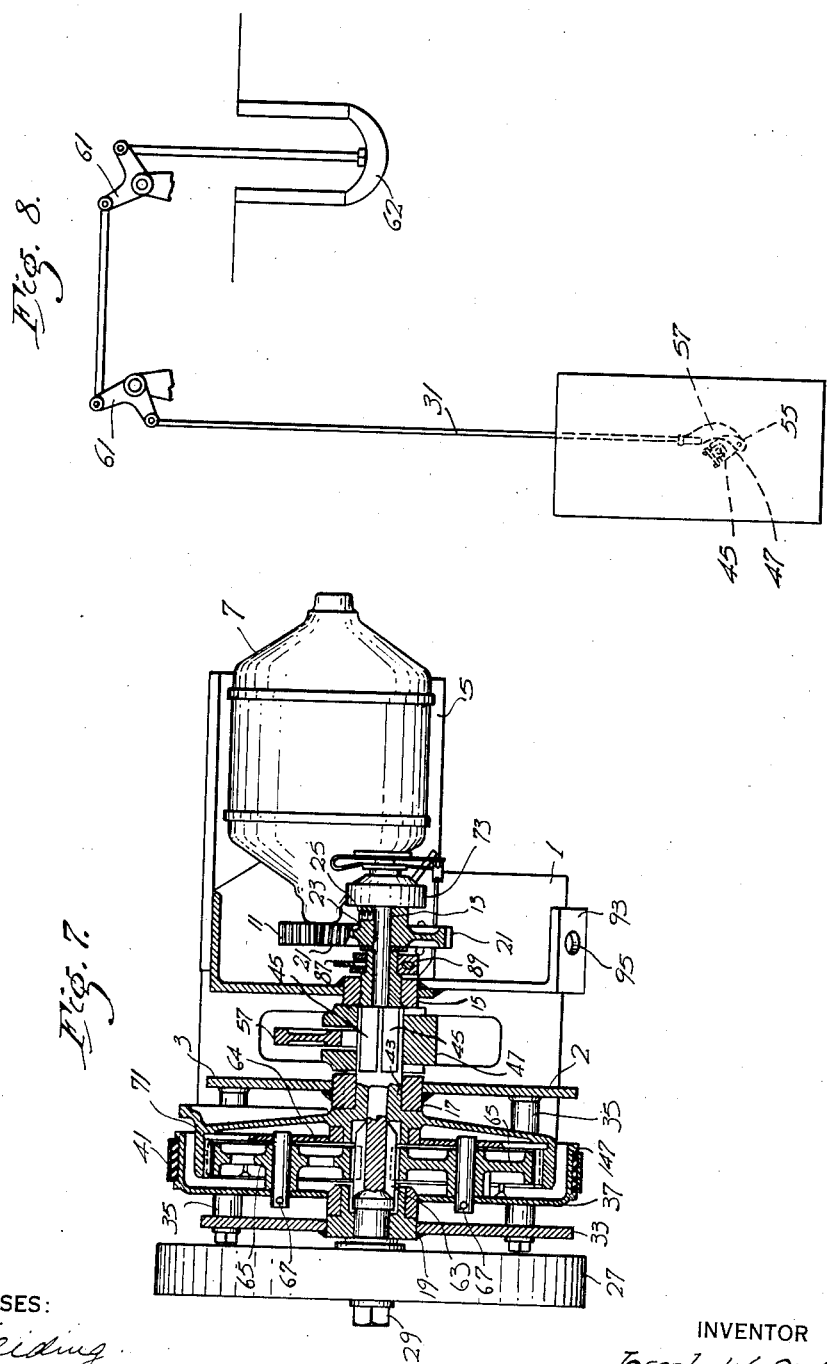
WITNESSES:
E. C. Leiding
G. S. Parker
INVENTOR
Joseph W. Ow
BY Ralph H. Swingle
ATTORNEY

UNITED STATES PATENT OFFICE 2,157,863

CONTROL APPARATUS

Joseph W. Ow, Wilkinsburg, Pa., assignor to Westinghouse Electric & Manufacturing Company, East Pittsburgh, Pa., a corporation of Pennsylvania Application August 26, 1936, Serial No. 97,936

22 Claims. (Cl. 200—92)

My invention relates to circuit breakers and more particularly to control apparatus for circuit breakers.

In many forms of circuit breakers, particularly large oil circuit breakers, the breaker is biased to open position by a spring or other means, and considerable energy is necessary to move the breaker to its closed position. It is important that such breakers be moved to their closed position in as short a period of time as is possible, particularly in instances where the breaker has been opened automatically in response to some transient condition on the line in which it is connected. A rapid reclosing operation is necessary in the later instance to prevent more than a very short interruption to the service.

Heretofore, it has been the practice to provide electric closing mechanisms for closing circuit breakers in which a solenoid or motor supplies the necessary energy throughout the closing stroke. Input energy was derived from a power line, battery or auxiliary line. For breakers requiring a large amount of energy to close the same, the current is necessarily high and the capacity of the storage battery or transformers must be sufficient to take care of the demands even though they only last for from ½ to 1 second with long intervening periods of inactivity in which the breaker is normally closed or open. This disadvantage has led to various schemes for closing a breaker by storing energy either in the kinetic or static form by some means which requires a relatively low input over an extended period of time. One method has been to utilize the energy of rotating fly balls rotated by a small electric motor to effect the closing or opening of the breaker. Another method consists in utilizing the energy stored in a fly wheel to effect the closing operation of the breaker. Few, if any, of the mechanisms embodying the above methods have proved entirely satisfactory from a practical standpoint for various reasons. One particular disadvantage has been that the mechanisms heretofore used have occupied a relatively large space. Other disadvantages have been lack of efficiency and failure to meet the requirement of a full automatic mechanism.

It is accordingly the primary object of my invention to provide an improved form of control apparatus for circuit breakers.

Another object of my invention is to provide an improved form of control apparatus which is highly efficient in operation.

Another object of my invention is to provide an improved form of control apparatus for circuit breakers which is fully automatic in the sense that it operates automatically to meet substantially all requirements that may be necessary in controlling the operation of a breaker.

Another object of my invention is to provide an improved form of control apparatus for circuit breakers which requires a low energy input over an extended period of time and which is capable of delivering a large amount of energy over a short period of time for the rapid operation of a breaker.

Another object of my invention is the provision of an improved form of control apparatus which is simple and rugged and which occupies a minimum amount of space.

Another object of my invention is the provision of an improved form of control apparatus for breakers which operates to effect a rapid closing operation of the breaker and latches the same in closed position.

Another object of my invention is to provide a control apparatus for a circuit breaker which may be either electrically or manually controlled to effect an opening or closing of the breaker.

Another object of my invention is to provide an improved form of control apparatus for a circuit breaker which utilizes stored energy to effect a rapid closing operation of the breaker.

Another object of my invention is to provide a control apparatus for a circuit breaker which is capable of beginning the closing of the breaker at any point during movement of the breaker to its open position.

Another object of my invention is to provide a control apparatus for a circuit breaker for effecting a rapid closing operation of the breaker and in which provision is made for interrupting the closing operation at any point in the same and allowing the breaker to move to its open position in response to predetermined conditions.

In general, the apparatus of my invention consists of an energy storing means in the form of a flywheel, a motor for driving the flywheel and storing energy in the same, a breaker operating rod, a differential gear train and clutch mechanism for connecting the flywheel with the breaker operating rod to close the breaker, and a plurality of electrical and manual control devices for controlling the apparatus and breaker.

The above stated objects and others ancillary thereto, as well as the preferred method of carrying out the invention will be made more apparent by the following detailed description taken with reference to the accompanying drawings wherein are shown views of the structural details of the apparatus utilizing the principles of my invention.

Referring to the drawings:

Figure 1 is a side elevation of the apparatus embodying the features of my invention.

Fig. 2 is a sectional view of the apparatus taken on the line II—II of Fig. 1, with parts broken away to more clearly illustrate certain features of my invention.

Fig. 3 is a rear elevational view of the apparatus shown in Fig. 1, with a portion of the frame and flywheel broken away to show certain features of my invention.

Fig. 4 is a side elevation of the apparatus shown in Fig. 1 taken from the opposite side thereof.

Fig. 5 is a perspective view of a portion of the apparatus shown in Fig. 1.

Fig. 6 is an elevational view of a manual operating member for use with the apparatus.

Fig. 7 is a horizontal sectional view taken on the line VII—VII of Fig. 1; and,

Fig. 8 is a diagrammatic view showing the connection between the breaker control apparatus and the breaker.

The circuit breaker control apparatus illustrated in Fig. 1 is mounted on a base 1 of suitable construction which may be secured to a floor or some other form of rigid support. Secured to the base in any suitable manner, as by welding, is a main frame 2 which supports the entire apparatus. The main frame consists of a plurality of vertically disposed supporting walls 3 and certain auxiliary supports secured thereto. A horizontally disposed shelf 5 is rigidly secured to one of said walls by any suitable means.

A standard motor 7 is mounted on the shelf 5 by means of bolts 9 passing through the motor base and engaging in openings provided in the shelf. As best shown in Fig. 7 the motor shaft has a helical gear 11 keyed to one end thereof. A main shaft 13 is rotatably mounted on the frame by means of bearings 15, 17 and 19 (Fig. 7) which are secured to portions of the frame. A helical gear 21 carried by a hub 23 is secured to the main shaft by suitable means, such as a key connection, or by set screws 25 as shown. The gear 21 is slightly larger than gear 11 and meshes with same. The gears are of such relative sizes that the main shaft is driven at approximately two thirds the speed of the motor 7. A relatively heavy flywheel 27 is secured to the end of the main shaft opposite the end carrying the gear 21. The weighted flywheel constitutes an energy storing means for the breaker closing operation as will appear hereinafter. The flywheel is secured to the main shaft by any suitable connecting means, as for example by the nut assembly 29. Provision may also be made for securing additional weights to the flywheel in any suitable manner.

The mechanism for transmitting the energy stored in the flywheel to the breaker operating rod 31 shown in Fig. 8 will now be described. An auxiliary frame 33 is secured in spaced relation to the main frame 3 by means of the bolt, nut and spacer assemblies 35. A brake drum 37 is rotatably mounted on a portion of bearing 19 which is carried by the auxiliary frame 33. A brake band 41 is mounted concentrically with respect to the drum and is adapted to grip the same when the band is tightened.

A hollow shaft 43 is rotatably mounted in the bearings 15 and 17 and is concentrically disposed about the main shaft 13. The hollow shaft is provided with a square portion 45 to which is clamped a lever arm 47, by means of the bolts 49, a cross piece 51, and nuts 53 as best shown in Fig. 2. The end of the lever arm 47 carries a pin 55 to which is pivotally connected one end of a curved arm 57. A breaker operating rod 31 is connected to a socket assembly 59, provided on the other end of the curved arm. The breaker operating rod connects the lever arm 47 with the breaker operating mechanism through the medium of a pair of pivoted bell crank levers 61 in the manner shown in Fig. 8. It will thus be seen that rotation of hollow shaft 43 and squared portion 45 in a clockwise direction will cause downward movement of the breaker operating rod to effect a closing of the moving contact 62 of the breaker. Figs. 2 and 8 show the lever arm 47 in the position in which the breaker is closed. A differential gear mechanism is provided for transmitting the rotation of shaft 13 to the hollow shaft 43. This mechanism consists of a number of teeth 63, six teeth in the embodiment shown, carried by the main shaft. These teeth form a sun gear which meshes with a pair of diametrically disposed planetary gears 65. The planetary gears are rotatably mounted on pinions 67 which are carried by the brake drum 37 and a spider 64. The teeth of the planetary gears in turn mesh with seventy-two internal gear teeth 69 formed on a drum 71 which is formed integral with the hollow shaft 43 and which extends within the brake drum 37.

The operation of this portion of the mechanism will be briefly described. The rotation of the motor shaft is transmitted to the main shaft 13 by means of helical gears 11 and 21. The sun gear 63 on the main shaft drives the planetary gears 65 causing them to climb the internal teeth of drum 71, since the drum is held stationary by its connection with the breaker which is biased by a strong spring to the open position. The gears 65 being rotatably secured to the brake drum 37 rotate the same at a reduced speed. The drum 71 in practice has seventy-two internal teeth which, with the six teeth on the sun gear, gives a gear ratio of 12 to 1. This ratio is quite high and the arrangement provides a large reduction in a relatively small space. When the brake band is tightened either manually or by an electromagnet as will be described hereinafter, the rotation of the brake drum 37 is stopped resulting in a reaction which causes the drum 71 to be driven through the intermediate planetary gears 65 by the sun gear 63. Thus the rotational energy stored in the flywheel, which is mounted on the same shaft as the sun gear, is transmitted through the above described gears, and the hollow shaft carrying the drum 71, to the lever 47, to effect a very rapid closing operation of the breaker.

It will thus be seen that the above arrangement provides an efficient means for closing the breaker in which only a small amount of energy is utilized to drive the motor which in a relatively short period of time stores considerable kinetic energy in the flywheel, the energy stored in the flywheel being utilized to effect the closing operation of the breaker.

Attached to the helical gear 21 is a standard centrifugal switch 73 of any conventional design which is provided to reclose the motor circuit whenever the speed of the main shaft drops below a predetermined speed. This switch may be included in a control circuit of the motor. An auxiliary switch 75 may be provided. This switch is shown mounted on a bracket 77 extending from and secured to the main frame. The switch 75 is operated by means of a shaft 79 which carries a crank arm 81 pivotally connected to an operating arm 83 by an adjustable connection 85. The other end of the operating arm 83 is pivotally connected to a second crank arm 87 carried by a coupling device 89 which is secured to a reduced portion of the hollow shaft 43. This switch may be used either to control the motor, the electro-magnetic means 182 for operating the brake band 41, or other apparatus in response to the operation of the main breaker.

Referring to Fig. 5, a manual operating means is provided for manually operating the breaker to various positions for adjustment or repair. The manual operating means consists of a bracket 91 secured to the main frame. The bracket carries a bent arm 93. The bracket and the bent end of the arm 93 are each provided with an opening 95 adapted to receive a shaft 97. The shaft 97 has a worm formed on one end thereof adapted to mesh with the teeth on the helical gear 11. The opposite end of the shaft has a crank arm 99 and handle 101 secured thereto as shown in Fig. 6. The end of the worm is provided with a hardened surface 103 adapted to engage a hardened stud 105 secured to the frame. The shaft 97 is inserted in the openings 95 and the worm thereof screwed into mesh with the helical gear 11 until the end 103 engages the stud 105. Now if the external or outer band 41 is tightened on the drum by a manual operation hereinafter described, the crank handle may be rotated to effect slow movement of the breaker through the differential gearing mechanism described in a preceding paragraph.

In most forms of oil breakers, the movement of the breaker operating mechanism is limited and is spring biased to open position. Accordingly stop means must be provided to limit movement of the hollow operating shaft 43. The stop means is best shown in Figs. 2 and 5 and consists of stop lug 107 secured to the main frame, an open position stop projection 109 formed integral with the external surface of the drum 71 and a closed stop projection 111 also formed integral with the drum 71. These stop projections are adapted to engage the opposite faces of the stop lug 107 in the open and closed positions respectively of the breaker.

Since most oil circuit breakers are provided with a biasing spring for biasing the breaker to the open circuit position as has been previously mentioned; means are provided in the apparatus for latching the breaker in closed circuit position after it has been moved thereto by the closing mechanism. The latch means consists of an integral curved surface 113 on the external rim of the drum 71, a detent 115 formed therein to provide a latch engaging shoulder 117, and a latch 119 pivoted on a support 121 secured to the frame. Referring to Fig. 2, the latch has a link 123 pivoted at one end to the nose of the latch, the other end of the link 123 is pivotally connected to one corner of a lever arm 125 which is in turn pivoted adjacent its upper end to the stationary support 121. The lever 125 has a projection 126 adapted to engage an edge of the support 121 to limit the movement thereof in a clockwise direction. The link 123 and the lever arm 125 thus form a toggle linkage and spring 127 has one end thereof secured to the support 121 and its other end secured to the pivot point between the link 123 and the lever 125. In Fig. 2, the latch is shown in latching position holding the breaker in its closed position.

A combined manual and electromagnetic tripping mechanism is provided for moving the latch to the released position. This mechanism comprises a lever 129 pivoted on a pin 131 secured to the main frame. The lever has a manually operated handle portion 133 at one end thereof and carries a pivot pin 135 at its other end. The pivot pin 135 rides in a slot 137 provided in a link 139. The link 139 is pivotally connected at its other end to the free end of the lever 125. When the handle portion 133 is depressed, the link 139 moves the lever 125 in a clockwise direction causing the toggle linkage 123—125 to collapse and thus move the latch 119 to released position. A slotted link 141 pivotally connects the lever 129 with the core 143 of a tripping solenoid 145. When the solenoid is energized, the latch is moved to released position in the same manner as when the lever 129 was manually operated.

A combined manual and electromagnet means is provided for operating the external brake band 41. The brake band 41 has a lining 147 secured to its inner surface, as by rivets, to frictionally engage the outer surface of the brake drum 37 and stop the same when the band is tightened. The brake band is held in spaced relation to the brake drum by means of a plurality of angle brackets 149 secured to the bolts 35. The band carries a plurality of radially extending bolts 151 each of which passes through an opening in its corresponding bracket. An expansion spring 153 surrounds each bolt and engages its bracket at one end. The other end of each spring is held under tension against a washer and lock nut assembly 155 carried by its bolt.

One end of the brake band is connected through an adjustable connecting means 157 to a pivot pin 159 on an eccentrically pivoted crank lever 161. The other end of the brake band is connected through a biasing connection to a second pivot pin 163 on the crank lever. The biasing connection consists of a lug 165 secured to the frame having an opening therein through which the connecting means for the brake band extends. A washer is secured to the connecting means and a spring 167 is coiled about the connecting means and held in tension between the fixed lug and the washer. The brake band is thus held biased in closely spaced relation to the brake drum and allows the drum to rotate freely about its axis.

The mechanism for operating the brake band comprises the crank lever 161, which is pivotally mounted on a stud 169, carried by a U-shaped stop block 170 welded to a portion of the frame, a manual operating lever 171 adapted to fit in a socket provided in the crank lever, an electromagnet 182 and pivoted armature 183 therefor, and a system of levers and links for transmitting the motion of the armature to the crank lever for operating the brake band to tighten the same. The shape of crank lever 161 is best shown in Fig. 5. The lever includes a socket portion 173, which is adapted to receive the operating lever 171, and a crank arm 175. Rotation of the crank lever in a counter-clockwise direction as viewed in Fig. 5 either by the operating lever 171 or by movement of the crank arm 175 effects a counter-clockwise movement of the pivot pins 159 and 163 which later movement results in a tightening of the brake band on the brake drum. It will be noted that the pivot pins 159 and 163 are located relatively close to the pivot point of the crank lever whereas the socket 173 and the end of the crank arm are each spaced a considerable distance from the same. This arrangement provides a considerable mechanical advantage for the operating lever and crank arm, whereby a relatively slight force applied to either will result in a large force applied to the pins 159 and 163 for tightening the brake band on the drum.

An opening 176 is cut in the frame for receiving the electromagnet assembly. A plurality of angle pieces consisting of laminated plates of magnetic material 177 are secured as by bolts 179 to the top of the frame and cooperate with a core 181 to form a path for the flux produced by the electromagnet. An armature 183 is pivotally secured to a cradle 184 which is in turn pivoted at 187 on extensions formed on the legs of the angle pieces; the armature extending to a position adjacent the pole faces of the electromagnet.

Referring to Fig. 2, the linkage for connecting the armature with the crank arm 161 consists of a bell crank 185 pivoted as at 187 to the frame, having one leg secured to a side lug 188 carried by the cradle 184, by means of nut and bolt assemblies 189. The other leg of the bell crank is pivotally connected to a second bell crank lever 191 by a pin 193. A link 195 is pivoted at one end to a pin 197 carried by the end of the crank arm 175 and at the other end to one leg 199 of the bell crank 191 by a pin 201. When the link 195 and the leg 199 of the second bell crank 191 are held in alignment, movement of the armature to its attracted position will cause the bell crank 185 to rotate in a clockwise direction as viewed in Fig. 2 to impart a thrust to the pin 197; the thrust being in a direction to cause the crank lever 161 to rotate in a counter-clockwise direction to effect tightening of the brake band.

A link 203 is pivoted adjacent one end to the pivot pin 201 which connects the link 195 to the leg 199. The other end of the link 203 is provided with a slot for receiving a pivot pin which is carried by one end of a bell crank lever 205. The other end of the bell crank lever 205 is pivotally connected to the pivot pin which connects link 139 to the lever 125. The bell crank lever 205 is pivotally hung by means of an extension 206 formed integral therewith to the pivot pin which supports the lever 125. A spring 207, connected between the end of link 203 and an extension 186 of bell crank 185, biases the link 195 and the leg 199 of the bell crank 191 to their aligned positions in which positions the reduced end of the leg 199 engages a portion of the crank arm 175 as shown in Fig. 5 to prevent further upward movement of aforesaid members. The link 195 and the leg 199 of the bell crank 191 thus form a toggle link which is biased by the spring 207 to what will be referred to as an operative position in which the link 195 and the leg 199 are held in alignment by the reduced end of the leg 199 engaging a portion of the crank arm as explained above.

The end 209 of the bell crank 191 is positioned to be engaged by a lug 211 formed on the rim of the drum member 71, during clockwise rotation of the same, at a time just prior to that in which the latch 119 drops into latching position in its detent 115.

An auxiliary switch 213 is secured to the frame adjacent the electromagnet assembly and is provided with a pair of terminals 215 adapted to be connected in a control or indicator circuit not shown. The switch 213 consists of a stationary contact 217 and a movable contact 219. The movable contact is biased to open position by means of a spring 221, and is adapted to be moved to closed position when the armature 183 is attracted by means of a projecting bent arm, carried by the extension 186 of the bell crank 185, which engages an adjusting screw 220 secured for movement with the movable contact carrying arm.

The operation of the apparatus is as follows: With the parts in the position shown in Fig. 2 in which the breaker is closed; rotation of the lever 129 in a counter-clockwise direction about its pivot 131, either by manual operation of the same or by energization of the trip electromagnet 145 will move the lever 125 in a clockwise direction to effect movement of the latch to the released position. The biasing spring of the breaker will cause the breaker to move to the open position and which will result in upward movement of the breaker operating rod 31 and counterclockwise rotation of the hollow shaft 43 and drum 71. The drum 71 will rotate until the projection 109 engages the stop lug 107. The latch now rests on the rim 113 of the drum 71. The breaker is now in the full open position.

The motor 7 may be either continuously rotated at a predetermined speed under the control of the centrifugal switch 73 or it may be started upon movement of the breaker to open position by the closing of switch 75 through the movement of the switch operating means 81—89 caused by rotation of the hollow shaft 43. The motor circuit may also be closed by any suitable form of control switch either by manual operation or automatically to suit the particular needs. The breaker closing operation is performed in the following manner: If the motor is not operating under control of the centrifugal switch, the motor circuit is closed either manually or by operation of the automatic switch consequent to the opening of the breaker. The motor reaches normal speed in approximately 10 seconds, at which time considerable kinetic energy is stored in the flywheel. Up to this point, the brake drum is rotating relatively slowly under the influence of the planetary gears as has been previously explained. Energization of the electromagnet 182 causes the armature 183 to move to its attracted position and since the toggle linkage formed by the link 195 and the leg 199 of the bell crank is in the operative position, i. e., with the link and leg held substantially in alignment by the spring 207, the crank lever 161 is rotated in a counterclockwise direction as viewed in Fig. 2. This movement of the crank lever effects tightening of the brake band and stops the rotation of the brake drum. The reaction produced causes the drum 71 to be driven by the gears 63, 65 and 69. The drum 71 and hollow shaft 43 now rotate in a clockwise direction as viewed in Fig. 2 and causes the crank 47 on the squared portion of the shaft 43 to move the breaker operating rod 31 downwardly to close the breaker. Immediately after the drum 71 has rotated a sufficient amount to close the breaker the projection 211 engages and moves the bell crank 191 in a counterclockwise direction. This movement of the bell crank breaks the toggle linkage consisting of link 195 and leg 199 thus releasing the crank lever 161 and brake band from the influence of the armature. At substantially the same instant the latch 119 drops into the detent 117 to hold the breaker in its closed position. At this time, the projection 111 engages the stop lug 107 to prevent any further movement of the drum 71. The same closing operation may be effected by manually depressing the operating lever 171. The closing operation is effected in approximately ½ of a second.

If during the closing operation, the tripping magnet 145 is energized, the closing stroke is interrupted and the breaker returns to the full open position. This is accomplished by downward movement of the link 203 caused by the clockwise rotation of the lever 125 influenced by the tripping movement of lever 129. The link 203 in moving downward breaks the toggle linkage 195—199 in the same manner as is effected by the lug 211 engaging the bell crank 191. This results in the release of the brake band as described above. Consequently, the breaker is free to move to its open position under the influence of its biasing spring. The closing of the breaker may be started at any point in the opening cycle after deenergization of the trip magnet by tightening the brake band either manually or by the electromagnet 182 through the linkage system. This is a desirable feature, since, if the breaker is used in a system arranged for quick automatic reclosing, it is advantageous to stop the moving contact of the breaker during its opening movement and return it to closed position before it has reached its full open position. This is possible since the arc is extinguished and the circuit cleared when the contacts have separated to only a fraction of their full travel Since the structural arrangement of the control apparatus is such that the driving connection between the flywheel and the breaker operating rod 31 can be established in any position of the operating rod even during circuit opening movement of the rod, the above-mentioned automatic quick reclosing operation can be accomplished by automatically closing the circuit to the brake band controlling electromagnet 182 at a predetermined point in the circuit opening movement of the breaker operating rod 31, namely, at a point in the circuit opening movement of the rod 31 immediately after the arc at the breaker contacts has been extinguished and before the rod has been moved to its full open circuit position. The circuit for the electromagnet 182 may be automatically closed at such predetermined point by a switch which is closed at such predetermined point in the opening cycle of the breaker. For example, a certain pair of the contacts of the auxiliary switch 75 may be arranged to close the circuit to the electromagnet 182 at the above-mentioned predetermined point in the opening cycle of the breaker to accomplish the quick automatic reclosing operation. The control apparatus is thus adapted for quick automatic reclosing of the circuit breaker and when so operated the reclosing time is materially reduced as well as the time of service interruption.

The switches and control electromagnets may be connected in numerous circuit relationships to exercise control of the apparatus. Certain of the switches may be connected to indicator circuits for indicating the operation of the apparatus and/or the position of the breaker. With the parts of the apparatus at rest and the motor circuit open, the breaker may be manually operated to any position by holding the operating lever 171 in its downward position to tighten the brake band, and rotating the crank 99.

The breaker may be moved to its closed position when the flywheel is rotating by depressing the handle 145 to tighten the brake band.

It will thus be seen that I have provided an improved apparatus for controlling a breaker, which may be either full or semi-automatic in operation or which may be operated manually to control the operation of the breaker. The compact arrangement of the differential clutch structure greatly reduces the number of parts necessary and the space occupied by the apparatus as a whole.

The relative sizes of the various parts may be changed to suit the particular needs. Likewise various changes may be made in the mechanical structure of the apparatus without departing from the spirit of the invention. For example, the flywheel may be dispensed with and the mass of motor armature and/or the mass of the shaft and gears may function as the energy storing means.

My copending application for "Control apparatus" Serial No. 111,822, filed November 30, 1936, forms a continuation-in-part of the present application.

While in accordance with the patent statutes, I have disclosed the foregoing details of one form of my invention, it is to be understood that the broad principles disclosed are capable of much wider application and that many of the details are merely illustrative. I desire, therefore, that the language of the accompanying claims shall be accorded the broadest reasonable construction and that my invention will be limited by only what is expressly stated therein and by the prior art.

I claim as my invention:

1. In a switch operating mechanism, an actuating member for moving the switch to an open or closed circuit position, a shaft, a relatively heavy mass rotatable with said shaft, means for driving said shaft, a differential gear train including a rotating member driven by said shaft and a main gear member connected to said actuating member, said rotating member when stopped causing said mass and main gear to move said actuating member to its switch closed position, and means for stopping rotation of said rotating member.

2. In a circuit controlling system including a switch, a switch operating member for moving said switch to an open or closed circuit position, a control apparatus for said operating member comprising a shaft, a relatively heavy flywheel secured on said shaft, an electric motor for driving said shaft, a differential gear train including a rotating member driven by said shaft and a main gear member connected to said operating member, said rotating member when stopped causing said flywheel to drive said main gear to move said switch to its closed position, said rotating member and main gear member disposed concentrically about said shaft and forming a housing for said gear train, and means for stopping rotation of said rotating member.

3. In a circuit controlling system, a circuit breaker, an operating member connected to said breaker and movable to an open or to a closed circuit position to open or to close said breaker, means biasing said breaker to its open circuit position, control apparatus for said breaker comprising a shaft, a relatively heavy mass secured on said shaft for rotation therewith, an electric motor for driving said shaft, a differential gear mechanism including a brake drum driven by said shaft and a main gear member connected to said operating member, said drum when stopped causing said mass and shaft to drive said main gear member through said gear mechanism and move said operating member to its closed circuit position, means for stopping rotation of said brake drum, means for automatically latching said gear member to hold said operating member in its closed circuit position, and means for automatically releasing said brake drum when said operating member arrives at its closed circuit position to disconnect said mass from said main gear.

4. In a circuit controlling system, a circuit breaker, a circuit breaker operating means for moving said breaker to an open or to a closed circuit position, means biasing said breaker to its open circuit position, a control apparatus for said operating means comprising a shaft, a flywheel secured on said shaft, a motor means for rotating said flywheel and shaft, a differential gear mechanism including a brake drum driven by said shaft and a main gear member connected to said operating means, a normally inactive brake means for said drum, means for operating said brake means to stop rotation of said drum to cause said flywheel to drive said main gear and effect a closing operation of said breaker.

5. In a circuit controlling system, a circuit breaker, operating means for moving said breaker to an open or to a closed circuit position, means biasing said breaker to its open circuit position, a control apparatus for said operating means comprising a shaft, a relatively heavy flywheel secured on said shaft, a motor means for rotating said flywheel and shaft, a differential gear mechanism including a brake drum driven by said shaft and a main gear member connected to said operating means, a normally inactive brake means for said drum, means for operating said brake means to stop rotation of said drum to cause said flywheel to drive said main gear and effect a closing operation of said breaker, and auxiliary switch means operated by said main gear.

6. In a circuit controlling system, a circuit breaker, operating means for moving said breaker to an open or to a closed circuit position, means biasing said breaker to its open circuit position, a control apparatus for said operating means comprising a shaft, a relatively heavy flywheel secured on said shaft, a motor means for rotating said flywheel and shaft, a differential gear mechanism including a brake drum driven by said shaft and a main gear member connected to said operating means, said brake drum and said main gear member being concentrically disposed about said shaft and forming a housing for the gears of said differential gear mechanism, a normally inactive brake means for said drum, means for operating said brake means to stop rotation of said drum to cause said flywheel to drive said main gear and effect a closing operation of said breaker.

7. In a circuit controlling system, a circuit breaker, operating means for moving said breaker to an open or to a closed circuit position, means biasing said breaker to its open circuit position, a control apparatus for said operating means comprising a shaft, a relatively heavy mass secured on said shaft, a motor means for rotating said mass and shaft, a differential gear mechanism including a brake drum driven by said shaft and a main gear member connected to said operating means, a normally inactive brake means for said drum, manual and current responsive means for operating said brake means to stop rotation of said drum to cause said mass to drive said main gear and effect a closing operation of said breaker.

8. In circuit controlling apparatus, a switch, a switch operating member movable to an open or to a closed circuit position to open or close said switch, a flywheel, motor means for rotating the same, a differential gear mechanism including a brake drum driven by said flywheel and a main gear connected to said switch operating member, a brake band surrounding said brake drum and slightly spaced therefrom, electromagnetic means for tightening said brake band to stop said drum and cause said flywheel to drive said main gear and effect a closing operation of said switch.

9. In a circuit controlling apparatus, a circuit breaker operating member biased to an open circuit position and movable to a closed circuit position, a shaft, a relatively heavy mass secured on said shaft for rotation therewith, a motor means for driving said mass and shaft, a differential gear mechanism including a brake drum driven by said shaft and a main gear connected to said operating member, said brake drum when stopped causing said mass to drive said main gear and move said operating member to its closed circuit position, and means for stopping said brake drum.

10. In a circuit controlling apparatus, a circuit breaker operating member biased to an open circuit position and movable to a closed circuit position, a shaft, a flywheel secured on said shaft, a motor means for driving said flywheel and shaft, a differential gear mechanism including a brake drum driven by said shaft and a main gear connected to said operating member, said brake drum when stopped causing said flywheel to drive said main gear and move said operating member to its closed circuit position, means for stopping said brake drum, means for automatically latching said operating member in its closed circuit position, and means for automatically releasing said brake drum when said operating member arrives at its closed circuit position.

11. In a circuit controlling apparatus, a circuit breaker operating member biased to an open circuit position and movable to a closed circuit position, a shaft, a relatively heavy mass secured on said shaft for rotation therewith, a motor means for driving said mass and shaft, a differential gear mechanism including a brake drum driven by said shaft and a main gear connected to said operating member, said brake drum when stopped causing said mass to drive said main gear and move said operating member to its closed circuit position, means for stopping said brake drum, means for automatically latching said operating member in its closed circuit position, means for automatically releasing said brake drum when said operating member arrives at its closed circuit position, and a trip device for releasing said latch to allow said breaker to move to its open circuit position.

12. In a circuit controlling apparatus, a circuit breaker operating member biased to an open circuit position and movable to a closed circuit position, a shaft, a relatively heavy mass secured on said shaft, a motor means for driving said mass and shaft, a differential gear mechanism including a brake drum driven by said shaft and a main gear connected to said operating member, said brake drum when stopped causing said mass to drive said main gear and move said operating member to its closed circuit position, means for stopping said brake drum, means for automatically latching said operating member in its closed circuit position, and means for automatically releasing said brake drum when said operating member arrives at its closed circuit position, and a current responsive trip device for releasing said latch to allow said breaker to move to its open circuit position.

13. In a circuit controlling apparatus, a circuit breaker operating member biased to an open circuit position and movable to a closed circuit position, a shaft, a relatively heavy mass secured to said shaft, a differential gear mechanism including a brake drum driven by said shaft and a main gear connected to said operating member, said brake drum when stopped causing said mass to drive said main gear and move said operating member to its closed circuit position, means for stopping said brake drum, means for automatically latching said operating member in its closed circuit position, means for automatically releasing said brake drum when said operating member arrives at its closed circuit position, and a trip device for releasing said latch to allow said breaker to move to its open circuit position and means interconnecting said trip device and said drum stopping means for rendering said drum stopping means ineffective during actuation of said trip device.

14. In a circuit controlling apparatus, a circuit breaker operating member biased to an open circuit position and movable to a closed circuit position, a shaft, a relatively heavy mass secured on said shaft, a motor means for driving said mass and shaft, a differential gear mechanism including a brake drum driven by said shaft and a main gear connected to said operating member, said brake drum when stopped causing said mass to drive said main gear and move said operating member to its closed circuit position, means for stopping said brake drum, means for automatically latching said operating member in its closed circuit position, means for automatically releasing said brake drum when said operating member arrives at its closed circuit position, and a current responsive trip device for releasing said latch to allow said breaker to move its open circuit position, and means interconnecting said trip device and said drum stopping means for rendering said drum stopping means ineffective during actuation of said trip device.

15. A circuit breaker control apparatus comprising a breaker operating member movable to an open or closed circuit position, a shaft, a relatively heavy flywheel secured on said shaft, a motor for driving said shaft, a differential gear train including a brake drum driven by said shaft and a main gear member connected to said operating member, said drum and main gear being concentrically disposed about said shaft and forming a housing for the gears of said train and means for stopping rotation of said brake drum to cause said flywheel to drive said main gear and move said operating member to its closed circuit position.

16. In circuit controlling apparatus, a switch, a switch operating member, a rotating relatively heavy mass, and means including a differential gear train and clutch device for transmitting the rotational energy of said mass to said switch operating member to close said switch.

17. In a circuit controlling apparatus, a switch, a switch operating member, means biasing said switch to an open position, a relatively heavy mass, means for rotating said mass to store energy in the same, means including a differential gear train and clutch device for connecting said mass to said switch operating member to close said switch, and means for automatically disconnecting said mass from its connection to said switch operating member when said switch reaches its closed position.

18. In a circuit controlling apparatus, a switch, a switch operating member, means biasing said switch to an open position, a relatively heavy flywheel, means for rotating said flywheel to store energy in the same, means including a differential gear train for connecting said flywheel to said switch operating member to close said switch, means for automatically disconnecting said flywheel from its connection to said switch operating member when said switch reaches its closed position, and means for latching said operating member to releasably hold said switch in its closed position.

19. In a controlling apparatus for a switch, an operating member for the switch, a shaft, a relatively heavy mass secured to said shaft for rotation therewith, means for driving said shaft, a differential gear train driven by said shaft, current responsive means for causing the rotational energy of said mass to be transmitted through said gear train to said operating member.

20. In a circuit controlling apparatus, a circuit breaker biased to open position, an operating member connected to said breaker and movable to close or open the same, a rotatable shaft, a flywheel secured on said shaft, a differential gear train concentrically disposed about said shaft, said gear train including a main internal gear connected to said operating member, a sun gear secured for rotation with said shaft, and a plurality of planetary gears meshing with said sun gear and main gear and rotatably secured to a brake drum, a brake band surrounding and spaced from said brake drum, and current responsive means for tightening said band to stop said drum.

21. Circuit controlling apparatus comprising a switch operating member, movable to an open circuit or to a closed circuit position, a shaft, a flywheel on said shaft, means for driving said shaft, a differential gear train including a sun gear having a relatively small number of teeth secured on said shaft, a drum having a relatively large number of gear teeth on its internal periphery, and a rotatable brake drum having its rim concentrically disposed about the first drum and carrying planetary gears in mesh with said sun gear and the teeth of said drum, said first drum being connected to said operating member, and means for stopping rotation of said brake drum to cause said flywheel to move said operating member to its closed position.

22. In a circuit controlling apparatus, a frame, a hollow shaft rotatably mounted in said frame, a drum secured on said shaft at one end thereof, an internal gear secured to the inner surface of the rim of said drum, a brake drum mounted opposite said first drum for rotation on said frame about the same axis as said shaft and first drum with the rim of said brake drum overlapping the rim of said first drum to form a gear housing, a brake band mounted on said frame surrounding the rim of said brake drum and spaced from the same, a main shaft rotatably mounted on said frame and extending through said hollow shaft and drums, means for driving said main shaft, a flywheel secured to said main shaft, said main shaft having a sun gear formed thereon within the housing formed by the drums, a pair of intermediate gears rotatably secured to the brake drum within the housing formed by the drums, and meshing with the sun gear and internal gear, a crank arm secured to a portion of said hollow shaft and pivotally connected to a switch operating rod, and electromagnetic means for tightening said brake band to stop said drum to cause said flywheel to operate said rod.

JOSEPH W. OW.